Figure 1:
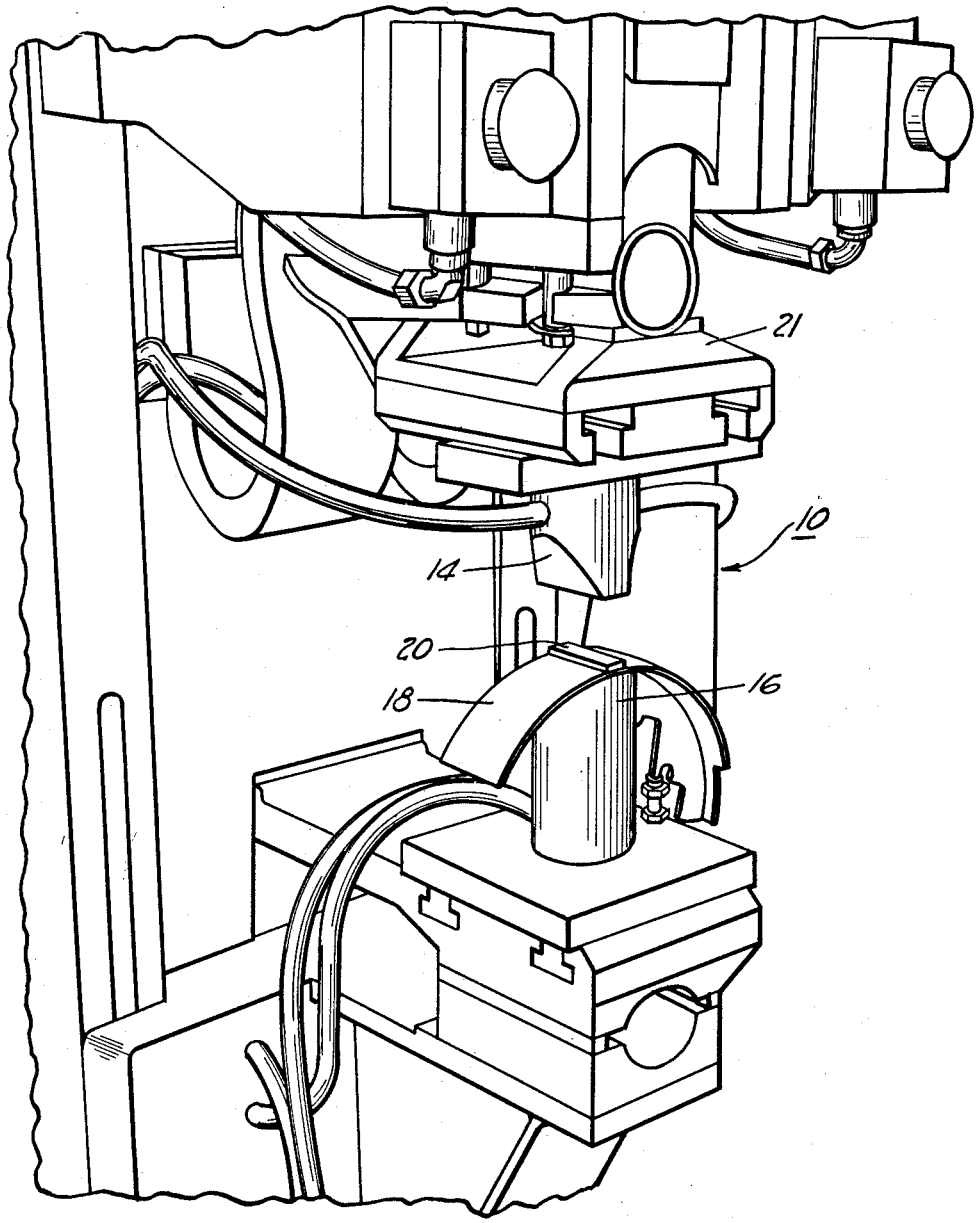

Feb. 13, 1962 J. R. WILLIAMSON ETAL 3,020,634
PROCESS FOR MOUNTING FRICTION SEGMENTS
Filed March 31, 1958 3 Sheets-Sheet 2
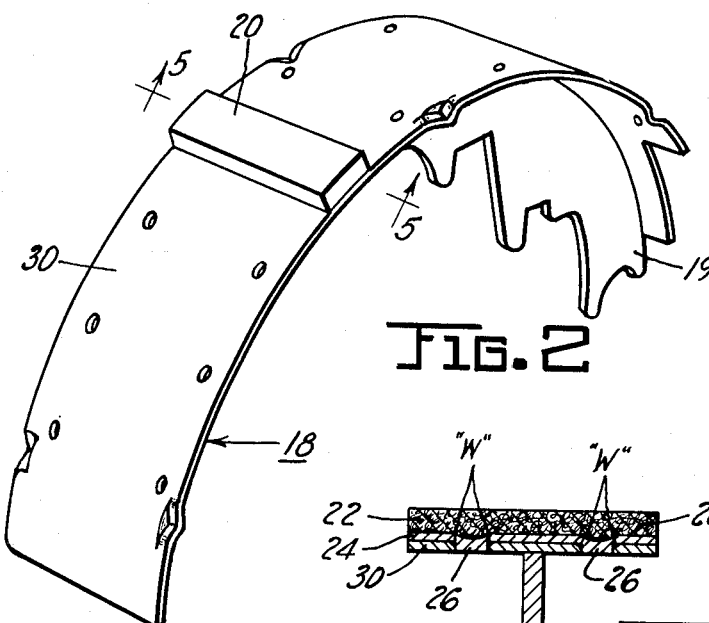
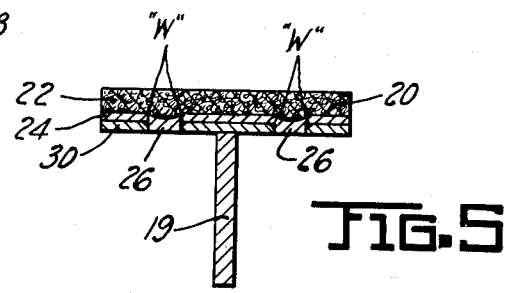
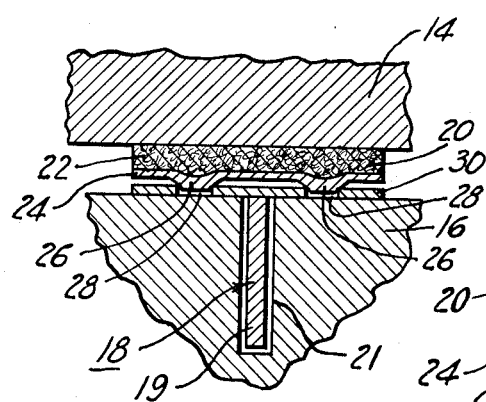
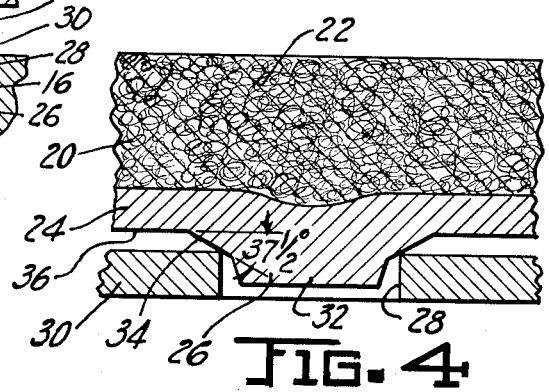
INVENTORS
JOSEPH R. WILLIAMSON
JAMES G. BILLMEYER
BY John A. Young
ATTORNEY Feb. 13, 1962     J. R. WILLIAMSON ETAL     3,020,634
PROCESS FOR MOUNTING FRICTION SEGMENTS
Filed March 31, 1958     3 Sheets-Sheet 3
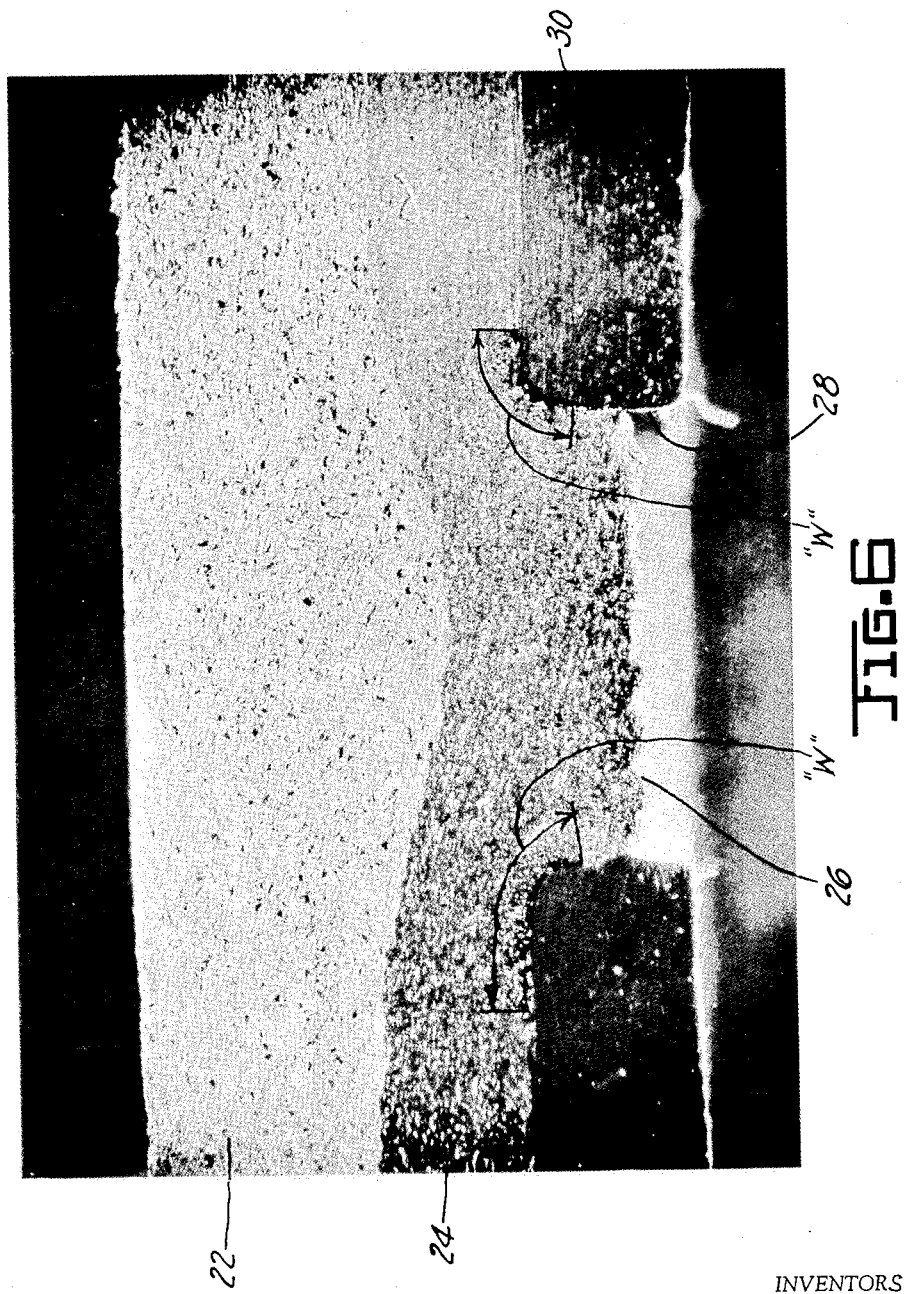
INVENTORS
JOSEPH R. WILLIAMSON
JAMES G. BILLMEYER
BY John A. Young
ATTORNEY

United States Patent Office 3,020,634
Patented Feb. 13, 1962

3,020,634
PROCESS FOR MOUNTING FRICTION SEGMENTS
Joseph R. Williamson and James G. Billmeyer, South Bend, Ind., assignors to The Bendix Corporation, a corporation of Delaware
Filed Mar. 31, 1958, Ser. No. 723,569
10 Claims. (Cl. 29—470)

This invention pertains to a process for the mounting of friction segments onto mounting members, such as arcuate brake shoes, stator plates, clutch plates, etc.

As a result of several major discoveries of recent years, a new class of friction materials has become available for automotive brake and clutch applications. The materials are metal-ceramic compounds noted for their heat resistance or stability under severe braking conditions. These friction materials first gained prominence in the aircraft wheel and brake art and are now being adopted for use in the field of automotive braking. Copending application No. 697,042, filed November 18, 1957, illustrates one of the structures which is being presently used on automotive brakes, and which uses metal-ceramic friction material combined with an organic friction material.

One of the difficulties which has recurred frequently in working with the described class of metal-ceramic friction materials is the means for mounting it onto the clutch plate, brake shoe or other carrier member. It has been found, for example, that the metal-ceramic friction material has characteristically low impact resistance and is not conducive to direct mechanical fastening onto the carrier member. Accordingly, as shown in copending application No. 654,866, filed April 24, 1957, there has been devised a method for mounting the metal-ceramic friction material through an intermediate, predominately metallic layer which serves as a bonding intermediate between the carrier member and the friction material. The two layers are joined together by compacting them together while they are both in powdered form and thereafter sintering the two layers to join them firmly together. This intermediate layer is more readily adapted to securement with the carrier member. Examples of various suitable metal-ceramic friction materials, and corresponding intermediate layer, are fully explained in the Masterson-Ferguson application No. 654,866 (supra).

It is one of the principal objects of the present invention to devise a mounting technique wherein the intermediate layer material can be joined to the carrier structure by means of a projection, resistance type weld wherein the welding is accomplished rapidly and the resulting hot forged dowel connection is capable of withstanding all of the tangential and normal forces which are normally encountered at the working surface of the friction segment.

The described welding process produces a doweling between the intermediate layer and mounting structure which becomes the principal resisting force to braking forces at the working surface of the friction segment and its opposing surface. The weld can prevent "lifting" of the friction segment away from the mounting structure. Since the weld is not extensively formed, we rely to a considerable extent on the doweling structure to resist shear forces. As a result, we have found a reliable and surprisingly efficient fastening technique which permits rapid assembly of the friction segment onto the mounting structure.

It will become clear later in the description that the bond is not inspectable. Therefore, it is essential to provide uniform welded connections which will consistently provide a reliable bond.

Other objects and features of the present invention will become apparent from a consideration of the following description, which proceeds with reference to the accompanying drawings, wherein:

FIGURE 1 is an isometric view of a welding machine which is suitable for performing the welding;
FIGURE 2 is an isometric view of a completed shoe assembly, having a metallic basic wiper segment secured thereto;
FIGURE 3 shows in cross section the shoe and wiper segment clamped between the electrodes of the welding machine just prior to the welding;
FIGURE 4 is an enlarged detail section view of the nib at the base of the friction segment of FIGURE 3;
FIGURE 5 is a section view taken on line 5—5 of FIGURE 2, following the welding step in FIGURE 3; and,
FIGURE 6 is a photographic enlargement (14×) of the dowel connection between the segment and shoe rim.

The welding machine which is designated generally by reference number 10 in FIGURE 1 forms no part of the present invention. It is of a conventional construction and among the various machines suitable for this purpose is one identified in the following manner:

It is manufactured by Taylor Winfield Company; projection and spot welding machine Type ERB-12-250; RWMA size 2, Style 1 roller bearing head; direct air operated; transformer rating 250 kva. at 50% duty cycle in accordance with RWMA standards for this class equipment. The machine ratings given are related to the size of the segments and are by no means critical or limitative of the invention. We have used, for example, with equal success 150 kva. welding machines for smaller segments.

The welding machine has the usual electrodes, an upper electrode 14 and a lower electrode 16 which receives the mounting member, in this case an arcuate shoe 18 (see FIGURE 3), and friction segment 20.

A power actuated ram 21 is provided in the machine to control the clamping pressure of the upper and lower electrodes. Controls are provided so that the operator can select whatever clamping pressure is suitable for the particular friction segment. This is known as the "squeeze" and the time of the squeeze is not critical.

The second interval is known as the "heat" during which the actual welding occurs. The third interval is the "hold" during which pressure is maintained to allow the weld to cool and harden. Of these last two mentioned intervals, the "heat" interval is critical and the "hold" is semi-critical in that pressure if released too soon can cause a defective joint.

Referring to FIGURES 3, 4 and 5, the friction segment 20 consists of a layer 22 of metal-ceramic friction material which is described in detail in application 697,042. The adjacent layer 24 consists of metal powder composed essentially of iron particles which are sintered concurrently with sintering of layer 22. The layers 22 and 24 are thus joined firmly together at their interface. Nibs 26 are constructed integrally with layer 24 with the sides either rounded or tapered so as to provide an interference fit in openings 28 of the shoe rim 30 (FIGURE 3).

The steps of the invention consist essentially in heating the nibs 26 and hot forging them into the undersize openings 28 by "plasticizing" or softening them sufficiently to permit this action. While the hot forging occurs there is a projection weld which forms concurrently between the nib 26 and hole 28 region labeled "W" for weld in FIGURE 6.

The accomplishment of these steps requires a proper selection of welding pressure and welding time and welding current. These parameters in turn are influenced by the nib size, construction and composition.

*Welding pressure*

The amount of welding pressure varies but as an example of working pressure a force of five hundred pounds is used for a friction segment having two projecting nibs which are about three sixty-fourths of an inch long and one quarter inch in diameter and are essentially powdered iron in composition.

When the welding heat is applied, the pressure on the bevel of the nibs must be sufficient to extrude the interfering portions of nibs 26 into the shoe rim openings 28 without fracturing or breaking either the nibs or the friction segment.

If the pressure is too low then the nibs will not be forced completely into the openings 28 and the resulting connection is less efficient. Also, if the pressure is insufficient, then layer 24 is not brought against the shoe rim 30 and the lack of support can produce cracking of the segment during service usage.

In summary: The pressure must be sufficient to hot forge the nibs into their associated openings but without fracturing or damaging the segment in the process of doing so.

Weld procedure

After pressure is brought to bear against the face of the friction segment, the machine is electrically energized to pass a controlled amount of current across the electrodes 14 and 16 and through the contact of nibs 26 and openings 28, thus heating up their region of engagement. The heating takes place at a selected intensity and for a selected duration, suitable controls being provided for this purpose. With a ferrous friction composition layer 24 welding time of ten to fifteen cycles of 60 cycle current is suitable. During the heating time, a large impulse of current is transmitted through the sample to weld the nib to the region labelled "W" surrounding the opening, FIGURE 6. It is estimated that ten to thirty thousand amperes of current unit 4–5 volt pressure passes through the sample under the described conditions, but this is an approximation. The described heating and welding intervals is appropriate for two 37½° nibs of ferrous composition and .250 companion openings.

Whether the part has been coined or not is of further importance in selecting proper voltage, amperage and weld interval. Coining generally follows sintering and as previously mentioned has the effect of densifying the layers 22 and 24 to remove porosity and increase the internal strength of the material against fracture or breakage.

Obviously, with changes in composition and other variations, such as compacting, etc., different machine settings will be required to achieve optimum voltage, amperage and time. It is well within the realm of the skill of the art to make these necessary selections. The voltage, amperage and welding time must be adjusted to prevent "spitting" or melting and ejection of the nib material within the associated opening. Welding heat must also be regulated to prevent cracking of the nib and segment. With coined segments, special care must be taken to control welding heat so as to avoid the greater tendency of these segments to split or crack.

Nib construction

Referring next to FIGURE 4, it has been found that the construction of the nibs 26 bears an important relationship to the efficiency of the weld bond. The tip 32 of the nib 26 is slightly tapered and the portion 34 between the tip 32 and the base 36 of layer 24 is inclined at an angle of about 37½° to the base so that its angle of interference with the surface of the opening 28 is approximately 52½°. When a smaller angularity is provided, in the range of about 30°, then an excess of material is present with the result that the interference fit of the inclined portion 34 of the nib 26 in the opening 28 prevents all the material from being squeezed therein during the welding process. As a result, the base 36 of the layer 24 is not brought against the rim 30 of the shoe and hence the lining segment lacks full bearing against the rim and is inadequately supported.

On the other hand, if the angle is increased up to about 45° then the interference fit is insufficient so that the weld bond between the nib and the surface adjacent the opening is inadequate.

This relationship of nib 26 and opening 28 in the shoe rim 30 has an important advantage in that the wiper segment 20 is properly and easily located on the shoe 18. Other welding arrangements with which I am acquainted have no such advantage of using interlocking parts to properly establish the position of the friction segments and also serve as the welding projection.

During compacting, the nibs 26 at the undersurface of the layer 28 can be formed to the appropriate angularity. The sintered product may then be "coined" or re-compacted if desired. It is essential that the layer 24 be formulated so that during sintering it will not separate from the adjoining metal-ceramic layer 22. Also, the nibs 26 of layer 24 must be weldable. The material most suitable for this purpose is a compounded iron base layer obtaining additions of graphite.

Since the two layers 22 and 24 are sintered materials, it was very surprising to learn that weld bonds could be formed between the edges of the nibs 26 and the regions adjacent openings 28. It was previously thought that forming a weld would impair the sinter-bonding within layer 22 or within layer 24, or at the interface between the two layers. The projection weld is confined, however, to the area noted in FIGURE 6 and it is achieved without any impairment of the other two sintered layers. The weld is sufficient in its strength for its intended purpose of holding the segment against the shoe rim and the shear force is resisted principally by the resulting dowel connection formed from hot forging the nib.

The total number of nibs is not critical. Although two nibs arrangement is described, it is also feasible to use 3, 4 or more nibs. Where greater shear resistance must be met, this can be provided by either increasing the cross sectional area of the nib or increasing the total number of nibs.

Process

To facilitate large scale manufacture, large quantities of shoes and friction segments are made available at the welding machine. The web 19 is fitted within a slot 21 of the lower electrode 16. The nibs 26 of friction segment 20 are then fitted into openings 28 and the machine is then actuated. Initially, the upper electrode 14 is brought downwardly against the outer face of the segment 20; then pressure is developed in a power cylinder (not shown) within the welding machine.

Next, electric current is passed across the electrodes and through the friction segment to heat up the inclined portion 34 of nibs 26 and the contracting edge of the openings 28 in the shoe rim 30. During the heat time, the machine develops sufficient temperature for a very short time duration (in the range of 10 to 15 cycles), in the inclined surface 34 of the nibs 26 and adjoining edges of openings 28 so that under pressure, they become hot forged together and the edges form a welded connection. The pressure, at the time of the welding, is sufficient to squeeze the nibs down into the openings so that the undersurface 36 of layer 24 is brought flatly against the outer surface of rim 30. There is thus formed a dowel connection between the friction segment 20 and shoe 18 and the circle of weld between the dowel and edge of opening 28 is so located that the weld is not subjected to appreciable shear stress by tangential loads at the outer working surface of the friction segment 20, the tangential load being resisted principally by the dowel connection. The weld thus functions principally to hold the layer 28 from lifting away from the rim 30 of the shoe 18.

The pressure between the electrodes 14, 16 is maintained after welding to give the weld an opportunity to cool and harden and thereafter the electrodes 14, 16 part and the shoe 18 is removed and replaced with a second shoe which is fitted with a segment in the same manner.

The entire cycle including loading and unloading consumes only about four to five seconds and it can be seen that this is well within high production techniques which are necessary for a rapid assembly to automotive standards.

One of the possible reasons why the described welding operation has not damaged the sintered bonding in layers 22 and 24 is that the large area of the electrodes 14, 16 distributes the current which becomes concentrated to produce localized heating only in the regions of the weld. There is thus set up a uniform heating throughout the segment 20 except in the regions of the weld where there is a localized temperature peaking sufficient to produce the weld.

The described processing considerations have been successfully used in the manufacture of an automotive brake having a segment two inches wide, three-quarter inch chordal length and one-quarter inch thickness; a pure iron backing 24 was used and an overlayer 22 of friction material of the following composition:

| | Percent |
|---|---|
| Iron | 60 |
| Kyanite | 14 |
| Bismuth | 11 |
| Graphite | 15 |

The lining and backing are compacted at 30,000 p.s.i., sintered at 1800° F., and then coined at 100,000 p.s.i.

The nib is .065 inch thick, has a taper of 37½° and is received in a .250 diameter opening which is .078 inch thick. The resulting dowel connection obtained in accordance with the foregoing described process will develop a resisting force, minimum—770 pounds force; maximum—1030 pounds force. Comparing this with the 550 pounds force obtainable with brass rivets, this is a superior fastener method to the conventional rivet fastener.

Although only one example embodiment of the invention has been selected to describe the invention, it will be apparent to those skilled in the art that numerous modifications and changes can be made without departing from the underlying principle of the invention. It is intended, therefore, to include such departures from the invention as are reasonably to be expected on the part of those skilled in the art, within the scope of the following claims.

We claim:

1. A method for fastening a nonweldable sinterable powdered material to a weldable ferrous attachment surface of a metal support comprising the steps of: compacting a layer of said nonweldable sinterable powdered material against a layer of a resistance weldable essentially ferrous material in a manner providing an attachment surface of said weldable layer, one of said attachment surfaces being shaped as a receiving recess and the other of said attachment surfaces being a protruding surface shaped for insertion into said recess with the side portions of said surfaces adjacent to said ends forming an interference of from approximately 45 degrees to approximately 60 degrees, sintering said compacted layers to form a sinter bond therebetween, centering and abutting said ends of said surfaces into generally line contact with each other, passing electrical energy through said surfaces until said layer of sintered resistance weldable material reaches a plastic state and terminating the flow of electrical energy before any appreciable amount of said material reaches a molten state, and forcing said surfaces together under pressure while said sintered weldable material is in a plastic state.

2. A method for fastening a nonweldable sinterable powdered material to an attachment surface of a wrought ferrous metal support comprising the steps of: compacting a layer of said nonweldable sinterable powdered material against a layer of a resistance weldable essentially ferrous material having a melting point substantially equal to that of said wrought metal in a manner providing an attachment surface on said weldable layer, one of said attachment surfaces being shaped as a receiving recess and the other of said attachment surfaces being a protruding surface shaped for insertion into said recess with the side portions of said surfaces adjacent to said ends forming an interference of from approximately 45 degrees to approximately 60 degrees, sintering said compacted layers to form a sinter bond therebetween, centering and abutting said ends of said surfaces into generally line contact with each other, passing electrical energy through said surfaces until the materials adjacent said attachment surfaces reach a plastic state and terminating the flow of electrical energy before any appreciable amount of said materials reach a molten state, and forcing said surfaces together under pressure while said materials are in a plastic state.

3. A method for fastening a nonweldable sinterable powdered material containing a ferrous powder to an attachment surface of a steel support comprising the steps of: compacting a layer of said nonweldable sinterable powdered material against a layer of resistance weldable essentially ferrous material in a manner providing a compacted weldable layer at least approximately ⅟₁₆ inch thick having an attachment surface on said weldable layer, one of said attachment surfaces being shaped as a receiving recess and the other of said attachment surfaces being a protruding surface shaped for insertion into said recess with the side portions of said surfaces adjacent to said ends forming an interference of from approximately 45 degrees to approximately 60 degrees, sintering said compacted layers to form a sintered bond therebetween, centering and abutting said ends of said surfaces into generally line contact with each other, compressing said surfaces together by means of electrical contacts positioned on respective outer surfaces of said nonweldable layer and steel support, passing electrical energy through said surfaces by means of said contacts for a period not exceeding approximately ¼ second at a rate which causes the material of said weldable layer adjacent its attachment surface to become plastic but without melting any appreciable amount of said layer during the time said surfaces are being compressed together, and holding said contacts into engagement with said outer surfaces after said current is shut off at least until the plastic weld material has solidified.

4. A method for fastening a nonweldable sinterable powdered material containing a ferrous powder to an attachment surface of a steel metal support comprising the steps of: compacting a layer of said nonweldable sinterable powdered material against a layer of resistance weldable iron base material in a manner providing a compacted weldable layer at least approximately ⅟₁₆ inch thick having an attachment surface on said weldable layer, one of said attachment surfaces being shaped as a receiving recess and the other of said attachment surfaces being a protruding surface shaped for insertion into said recess with the outer ends of said recess and protruding surface being of substantially the same cross section with the side portions of said surfaces adjacent to said ends forming an interference of from approximately 45 degrees to approximately 60 degrees, sintering said compacted layers to form a sintered bond therebetween, centering and abutting said ends of said surfaces into generally line contact with each other, compressing said surfaces together by means of electrical contacts positioned on respective outer surfaces of said nonweldable layer and metal support, passing electrical energy through said surfaces by means of said contacts for a period not exceeding approximately ¼ second at approximately 19,000 amperes per lineal inch of contact during the time said surfaces are being compressed together, and holding said contacts into engagement with said outer surfaces after said current is shut off at least until the plastic weld material has solidified.

5. A method for fastening a nonweldable sinterable powdered material containing a ferrous powder to a steel support having a recess therein whose sidewalls form an attachment surface, comprising the steps of: compacting a layer of said nonweldable sinterable powdered material against a layer of resistance weldable essentially ferrous material in a manner providing a compacted weldable layer at least approximately 1/16 inch thick having a projection therein whose sides form an attachment surface for insertion into said recess with the outer ends of said recess and projection being of substantially the same cross section with the side portions of said surfaces adjacent to said ends forming an interference of from approximately 45 degrees to approximately 60 degrees, sintering said compacted layers to form a sintered bond therebetween, centering and abutting said ends of said surfaces into generally line contact with each other, compressing said surfaces together by means of electrical contacts positioned on respective outer surfaces of said nonweldable layer and metal support, passing electrical energy through said surfaces by means of said contacts for a period not exceeding approximately 1/4 second at a rate which causes the material of said weldable layer adjacent its attachment surface to become plastic but without melting any appreciable amount of said layer during the time said surfaces are being compressed together, and holding said contacts into engagement with said outer surfaces after said current is shut off at least until the plastic weld material has solidified.

6. A method for fastening a nonweldable sinterable powdered material containing a ferrous powder to an attachment surface of a steel support having a recess therein whose sidewalls form an attachment surface, comprising the steps of: compacting a layer of said nonweldable sinterable powdered material against a layer of resistance weldable iron base material in a manner providing a compacted weldable layer at least approximately 1/16 inch thick having a projection therein whose sides form an attachment surface for insertion into said recess with the outer ends of said recess and projection being of substantially the same cross section with the side portions of said surfaces adjacent to said ends forming an interference of from approximately 45 degrees to approximately 60 degrees, sintering said compacted layers to form a sintered bond therebetween, centering and abutting said ends of said surfaces into generally line contact with each other, compressing said surfaces together by means of electrical contacts positioned on respective outer surfaces of said nonweldable layer and metal support, passing electrical energy through said surfaces by means of said contacts for a period not exceeding approximately 1/4 second at approximately 19,000 amperes per lineal inch of contact during the time said surfaces are being compressed together, and holding said contacts into engagement with said outer surfaces after said current is shut off at least until the plastic weld material has solidified.

7. A method for fastening a nonweldable sinterable powdered material containing a ferrous powder to an attachment surface of a wrought steel support comprising the steps of: compacting a layer of said nonweldable sinterable powdered material against a layer of a resistance weldable essentially ferrous material having a melting point substantially equal to that of said wrought steel in a manner providing an attachment surface on said weldable layer, one of said attachment surfaces being shaped as a receiving recess and the other of said attachment surfaces being a protruding surface shaped for insertion into said recess with the outer ends of said recess and protruding surface being of substantially the same cross section with the side portions of said surfaces adjacent to said ends forming an interference of from approximately 45 degrees to approximately 60 degrees, sintering said compacted layers to form a sinter bond therebtween, coining said sintered layers together, centering and abutting said ends of said surfaces into generally line contact with each other, passing electrical energy through said surfaces until the materials adjacent said attachment surfaces reach a plastic state and terminating the flow of electrical energy before any appreciable amount of said materials reach a molten state, and forcing said surfaces together under pressure while said materials are in a plastic state.

8. A method for fastening a nonweldable sinterable powdered material containing a ferrous powder to a steel support having a recess therein whose sidewalls form an attachment surface, comprising the steps of: compacting a layer of said nonweldable sinterable powdered material against a layer of resistance weldable essentially ferrous material in a manner providing a compacted weldable layer at least approximately 1/16 inch thick having a projection therein whose sides form an attachment surface for insertion into said recess with the outer ends of said recess and projection being of substantially the same cross section with the side portions of said surfaces adjacent to said ends forming an interference of from approximately 45 degrees to approximately 60 degrees, sintering said compacted layers to form a sintered bond therebetween, coining said sintered layers together, centering and abutting said ends of said surfaces into generally line contact with each other, compressing said surfaces together by means of electrical contacts positioned on respective outer surfaces of said nonweldable layer and metal support, passing electrical energy through said surfaces by means of said contacts for a period not exceeding approximately 1/4 second at a rate which causes the material of said weldable layer adjacent its attachment surface to become plastic but without melting any appreciable amount of said layer during the time said surfaces are being compressed together, and holding said contacts into engagement with said outer surfaces after said current is shut off at least until the plastic weld material has solidified.

9. A method for fastening a nonweldable sinterable powdered material containing a ferrous powder to an attachment surface of a steel metal support comprising the steps of: compacting a layer of said nonweldable sinterable powdered material against a layer of resistance weldable iron base material in a manner providing a compacted weldable layer at least approximately 1/16 inch thick having an attachment surface on said weldable layer, one of said attachment surfaces being shaped as a receiving recess and the other of said attachment surfaces being a protruding surface shaped for insertion into said recess with the outer ends of said recess and protruding surface being of substantially the same cross section with the side portions of said surfaces adjacent to said ends forming an interference of approximately 52½ degrees, sintering said compacted layers to form a sintered bond therebetween, coining said sintered layers together, centering and abutting said ends of said surfaces into generally line contact with each other, compressing said surfaces together by means of electrical contacts positioned on respective outer surfaces of said nonweldable layer and metal support, passing electrical energy through said surfaces by means of said contacts for a period not exceeding approximately 1/4 second at approximately 19,000 amperes per lineal inch of contact during the time said surfaces are being compressed together, and holding said contacts into engagement with said outer surfaces after said current is shut off at least until the plastic weld material has solidified.

10. A method for fastening a nonweldable sinterable powdered material containing a ferrous powder to an attachment surface of a steel support having a recess therein whose sidewalls form an attachment surface, comprising the steps of: compacting a layer of said nonweldable sinterable powdered material against a layer of resistance weldable iron base material in a manner providing a compacted weldable layer at least approximately 1/16 inch thick having a projection therein whose sides form an attachment surface for insertion into said recess with the outer ends of said recess and projection being of substantially the same cross section with the side portions of said surfaces adjacent to said ends forming an interference of approximately 52½ degrees, sintering said compacted layers to form a sintered bond therebetween, coining said sintered layers together, centering and abutting said ends of said surfaces into generally line contact with each other, compressing said surfaces together by means of electrical contacts positioned on respective outer surfaces of said nonweldable layer and metal support, passing electrical energy through said surfaces by means of said contacts for a period not exceeding approximately ¼ second at approximately 19,000 amperes per lineal inch of contact during the time said surfaces are being compressed together, and holding said contacts into engagement with said outer surfaces after said current is shut off at least until the plastic weld material has solidified.

References Cited in the file of this patent

UNITED STATES PATENTS

| | | |
|---|---|---|
| 1,154,808 | Rietzel | Sept. 28, 1915 |
| 2,425,053 | Swinehart | Aug. 5, 1947 |
| 2,464,437 | Dasher | Mar. 15, 1949 |
| 2,569,059 | Huff et al. | Sept. 25, 1951 |